Sept. 14, 1954   F. A. W. LEFFER   2,689,210
METHOD AND APPARATUS FOR EFFECTING THE CONVERSION
OF REACTANTS IN CONTACT WITH PARTICULATED
SOLID MATERIAL
Filed Sept. 29, 1950
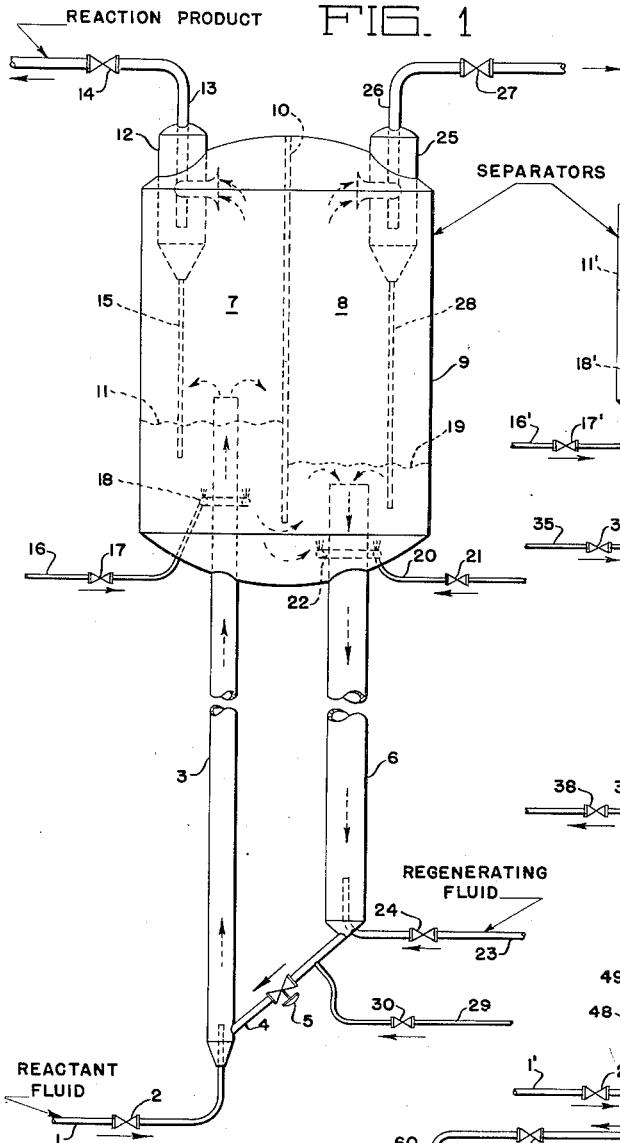
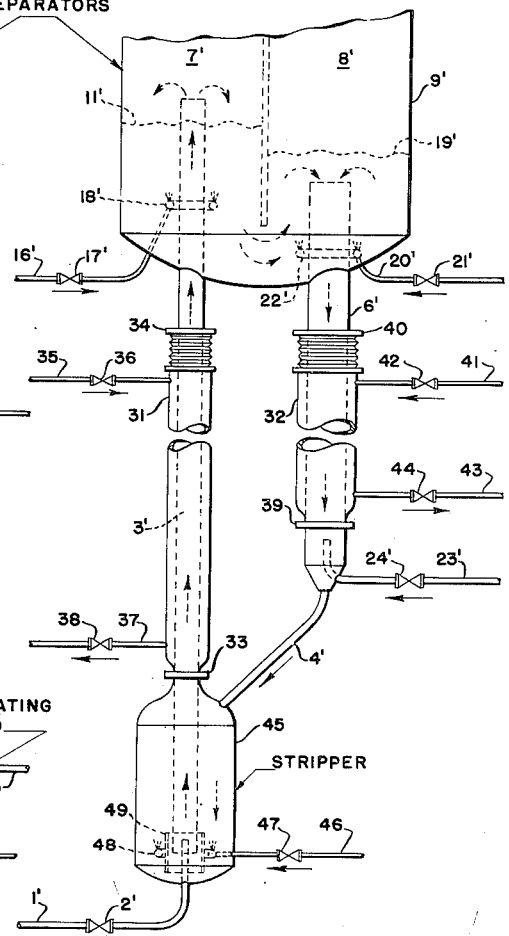
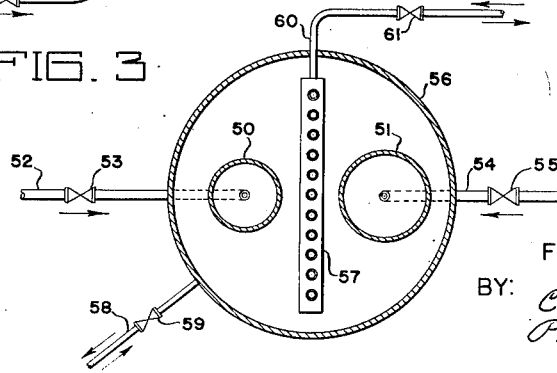
INVENTOR:
FREDERICK A. W. LEFFER
BY: Chester J. Giuliani
Philip T. Liggett
ATTORNEYS:

Patented Sept. 14, 1954

2,689,210

UNITED STATES PATENT OFFICE 2,689,210

METHOD AND APPARATUS FOR EFFECTING THE CONVERSION OF REACTANTS IN CONTACT WITH PARTICULATED SOLID MATERIAL

Frederick A. W. Leffer, Riverside, Ill., assignor to Universal Oil Products Company, Chicago, Ill., a corporation of Delaware Application September 29, 1950, Serial No. 187,544

8 Claims. (Cl. 196—52)

1

This invention relates to an improved method and apparatus for effecting the conversion of reactant streams in the presence of subdivided particles, and more particularly for carrying out the continuous conversion of a fluid reactant in contact with particles of solid material therein as a dispersed suspension in an elongated tubular reaction zone.

The term "dispersed suspension" as herein used connotes a mass of solid particles suspended in a current of fluid rising past the particles with continuous solids entrainment so that the fluid and solid particles travel upwardly through a confining zone as a continuous stream, that is a stream within which there is no boundary zone across which a marked change in concentration of particles occurs. The term "fluidized bed" as used herein means a mass of solid particles which exhibits the liquid-like characteristics of mobility, hydrostatic pressure, and an observable upper free surface or boundary zone across which a marked change in concentration of particles occurs. The term "moving bed" as used herein refers to a body of solid particles in which the particles remain in contact with each other while they move all in the same direction and at practically the same rate with respect to the walls of the confining zone.

A great variety of systems utilizing chambers of large diameter or tubular zones of much smaller diameter has been proposed for the contacting of at least two fluid reactants with particulated solid material maintained in cyclic circulation in the system. The tubular systems of this group have found practically no large scale industrial application. The usual type of fluidized contacting and conversion unit now employed in commercial installations for the conversion of hydrocarbon reactant streams, provides an enlarged reaction zone wherein a vaporized reactant stream either concurrently or countercurrently contacts the subdivided catalyst particles in a relatively dense fluidized bed, above which there is maintained a light phase zone of low particle concentration, such that the bulk of the catalyst particles may be separated from the vaporous stream, prior to the latter being passed through mechanical or electrical separating apparatus and discharged from the unit.

Low gas or vapor velocities are used in the dense phase fluidized bed contacting to provide high bulk densities, usually of the order of 20 to 35 pounds per cubic foot, and the contact beds may be from a few feet in depth up to the order of 20 feet or more. Dispersed suspension phase

2 contacting, as contemplated in the present method of conversion, utilizes higher vapor velocities, upwardly from about 10 and more commonly of from 15 to 65 feet per second so that lower bulk densities, such as of about 15 to 5 pounds or less per cubic foot result, that are densities similar to those prevailing in the riser lines of conventional fluidized dense bed systems.

Reaction chambers as well as regeneration chambers, which are designed to maintain a dense phase fluidized bed of catalyst and a disengaging zone, are necessarily rather large and expensive, and in addition such chambers require a substantial amount of supporting foundation and superstructure which adds to the installation cost. Uniformity of reaction is more difficult to attain in reaction vessels of large cross-sectional area than in tubular reactors. Also, a fluidized operation utilizing the large conventional type of contacting chamber requires a considerable quantity or inventory of catalyst or other particulated solid material to insure adequate contacting between the fluid reactant and the particles in order to assure the desired conversion. Similar considerations apply to those contacting systems that utilize compact moving beds of particulated catalytic or inert or reactive solid material in enlarged chambers. Moreover, the latter type of system as used in industrial practice has been provided with elaborate structural devices within the chambers for attaining uniformity of reaction and fluid reactant distribution or fluid product withdrawal and includes a mechanical or pneumatic elevator solely for the purpose of transferring particulated solid from the lowest to the highest level in the solids cycle.

It is a principal object of this invention to provide a method for converting a fluid reactant stream in the presence of subdivided contacting material in an improved and simplified manner in tubular reaction zones such that the need of large diameter contacting chambers is substantially eliminated.

It is a further object of this invention to provide an improved method for simultaneously reacting separate fluid streams in separate elongated or tubular reaction zones with continuous circulation of solid material through these zones and connecting passageways and with separate recovery of the fluid reaction product streams in a manner assuring an unusually small requirement of energy for maintaining the solids circulation and at the same time an unusually small inventory of solid particulated material in the cyclic path traversed by the circulating solid.

It is also an object of this invention to combine separate tubular shaped reaction zones and a single divided separating chamber in such manner that a continuous conversion unit is formed in which large chamber and particle transfer conduit construction is minimized.

It is a further object of the present invention to provide a partitioned separating zone maintaining two contiguous fluidized beds of particles and means for passing particles from one bed to the other such that gasiform product streams may be independently separated from the particle beds within each portion of the separating zone, and the latter is coordinated with substantially vertical tubular contacting zones to form a compact unit of moderate height.

It is a still further object of the present invention to provide a construction and arrangement which is peculiarly adapted to the performance of the method described herein and which positions substantially vertical tubular conversion zones in a side by side relationship permitting heat transfer therebetween and in which one of the solids transfer passageways between the tubular conversion zones is provided in a single separating chamber which at the same time permits separate recovery of the fluid product streams from the conversion zones.

In a broad embodiment, the present invention provides a continuous solids contacting method which comprises commingling particles of subdivided solid material in a mixing zone with a fluid reactant stream, passing the commingled materials upwardly as a dispersed suspension through a confined elongated up-flow reaction path discharging into a confined separating zone, separating the resultant suspension in a particle separating section of said separating zone into fluid products and solid particles and gravitating the latter into a fluidized dense phase particle bed maintained in said separating zone at a level below the discharge of said up-flow path, continuously withdrawing particles from said fluidized bed downwardly into a confined elongated solids down-flow reaction path and passing them therethrough in a descending bed in counter-current contact with a fluid stream reacting therein, discharging reacted fluid upwardly from said solids down-flow path into a dilute phase region maintained within said separating zone above the fluidized bed therein and separate from said separating section thereof, continuously withdrawing said fluid products from said separating section and said reacted fluid from said dilute phase region through separate outlets of said separating zone, and discharging a stream of solid particles from the lower portion of said solids down-flow path into said mixing zone.

The use of the present improved flow and simplified construction need not be limited to any one particular process or conversion operation, but may be used advantageously with any of the operations wherein fluidized subdivided particles are contacted by one or more reactant streams in a continuous operation. The conversion may be thermal, and the subdivided solid material being passed continuously from one of the tubular reaction zones to another may participate as a reactant in the conversion, or it may be a substantially inert heat-transferring or spacing material remaining unchanged during the desired conversion of fluid reactant in contact therewith. The improved flow moreover, may be utilized for catalytic conversion operations such as those used in the petroleum and petrochemical industries.

The principles governing the fluidized contacting of suitable solid catalytic material in finely divided state with various hydrocarbon streams to effect cracking, reforming, dehydrogenation, or the like, and proper conversion conditions therefor are now commonly understood in the petroleum art and need not be described herein at length, and they may be applied advantageously in the present flow method and the simplified construction and arrangement of the apparatus of this invention. It should be noted, however, that the present flow method permits the performance of catalyzed reactions of fluid hydrocarbonaceous reactants at otherwise practically equal conditions of temperature, pressure, catalyst and product yields in a reaction time which is from about 15 to about 35 percent shorter than that hitherto afforded the reactants in contact with catalyst in industrial installations of the chamber type for fluidized dense phase bed operation. Moreover, the catalyst inventory in the solids circuit of the present tubular reaction paths unit amounts to only about 45 to 60 percent by weight of the catalyst in the conventional industrial chamber type units for substantially the same rate of reactant throughput.

The present arrangement provides for continuous contacting within two principal zones which are elongated or tubular shaped, with each connecting to a common separating chamber. The separating chamber is preferably in an elevated position at the upper extremity of each of the tubular contacting zones such that the latter may be closely spaced and vertically positioned. Thus, the arrangement is particularly adapted to conversion operations utilizing a reaction zone and a regeneration zone, such as in hydrocarbon conversion processes, where the hydrocarbon stream is converted to a desired product in the presence of active catalytic material, and used catalyst is subsequently contacted in a regenerating zone to effect the reactivation of the particles.

In a somewhat more specific embodiment, the present invention provides for effecting the fluidized contacting of catalytic material with a fluid hydrocarbonaceous reactant in a continuous process which comprises, commingling the hydrocarbonaceous reactant stream with a stream of subdivided catalyst particles to form a dispersed suspension, passing this suspension upwardly at conversion conditions through a confined tubular up-flow reaction path to an elevated and confined separating zone and discharging the resultant suspension of solid particles in fluid conversion products into one section of this separating zone at a point or elevation above a fluidized dense phase particle bed maintained therein, effecting the substantial separation of catalyst by gravitation from the resulting fluid product stream within this section of the separating zone and discharging the fluid product stream therefrom, continuously passing the separated catalyst particles in a lateral flow in the fluidized dense phase bed to an adjacent fluidized catalyst bed maintained in a second section of the separating zone, continuously withdrawing catalyst particles downwardly from the last-mentioned catalyst bed and passing them as a descending column of particles through a confined tubular solids down-flow reaction path and countercurrently therein to an ascending reactivating fluid, discharging the used reactivating fluid as a separate stream from the second section of the separating zone and continuously passing reactivated catalyst particles from the lower end of the descending column to the lower end of the tubular up-flow path for commingling with the hydrocarbonaceous reactant stream.

From the construction and arrangement aspect, the present invention provides a simplified form of apparatus which utilizes a single separating chamber, partitioned into two sections to accommodate the upper terminal portions of the tubular contacting zones, such that particles may be transferred from one section to the other substantially by lateral flow in the lower portion of the separating chamber, but resulting fluid product streams are maintained separated from one another and are independently discharged from the upper portions of the separate sections of the separating chamber. Briefly, a simplified form of a unitary contacting apparatus in accordance with the present invention, comprises in combination, an elongated solids up-flow tube and an elongated solids down-flow tube, each of the tubes having open upper ends extending into the interior of a confined separating chamber, the separating chamber have partitioning means extending from the upper portion to within a short distance of the lower end thereof and dividing the chamber into two separating sections, the up-flow tube terminating at a higher elevation within one of the separating sections than the down-flow tube terminating within the other separating section at an elevation at least as high, and preferably higher than the lower end of the partitioning means, fluid outlet means from the upper portion of each of said sections of the separating chamber, fluid inlet means at the lower portion of each of the separating sections, a reactant inlet to the lower end portion of the up-flow tube, another reactant inlet to the lower end portion of the solids down-flow tube, and conduit means connecting the lower end of the latter tube with the lower end of said up-flow tube so that solid particles may be passed in a continuous cyclic flow through the apparatus.

The fluid inlet means at the lower portion of each of the sections of the separating chamber may advantageously be provided with suitable distributing headers that facilitate maintenance and control of a fluidized dense phase particle bed within the lower portion of each of the sections of the separating chamber and simultaneously therewith the stripping of entrained or occluded fluid products from the solid particles at least in the section surrounding the discharge end of the tubular up-flow path. Also, stripping and aerating inlet means may be provided in connection with the conduit means connecting the lower ends of the vertical, adjacent particle contacting tubes, or alternatively, a stripping chamber may be provided at the lower end of the up-flow tube to effect a more efficient stripping of contacted particles as they pass from the solids down-flow tube to the up-flow tube.

By placing the elongated contacting tubes which in a particular mode of use contemplated herein accommodate a reaction zone and a regenerating zone, in a relatively close parallel arrangement a very simple and compact construction of the unitary apparatus is possible, with only one large diameter vessel, comprising the separating chamber, being utilized. The separating chamber itself need not be unduly large, but should be of adequate size or volume to permit velocity reduction and the gravity separation of particles from the fluid streams discharged from the contacting tubes upwardly into the separate sections of this chamber in order to remove a substantial portion of the suspended particles from these streams and permit relatively low particle loadings on electrical or mechanical separating means that may be arranged within or outside the separating chamber and connected with the fluid outlets from the upper portions of the separate sections thereof.

It is also within the scope of the present invention to provide the particle contacting or solids up-flow and down-flow tubes with suitable jackets or containing means that will accommodate heat exchange fluids, for heating or cooling purposes. As will be discussed more fully hereinafter, the jacketing or heat exchange means may provide for transferring heat from an exothermic tubular reaction zone to an endothermic tubular reaction zone, or for independently controlling the heating or cooling of one or another of the reaction zones.

The present apparatus is adapted to effect fluidized particle contacting operations, wherein particles are carried in dispersed suspension in a fluid reactant stream upwardly through one of the tubular reaction zones and passed downwardly in a relatively compact moving bed or fluidized dense phase bed through the other of the tubular contacting zones countercurrently to another fluid reactant stream ascending therein, with means for effecting the fluidized lateral transfer of particles within the lower portion of the separating chamber. This lateral transfer is accommodated by the fluidized particle beds maintained in the separating chamber and communicating with each other across the space left open between the partitioning means in the separating chamber and the bottom of the latter. The fluidized beds are ordinarily quite shallow and need have only sufficient depths to seal the separating sections effectively against flow of fluid products from one of these sections to the other. Thus, solid particles are carried from an up-flow contacting tube to a solids down-flow contacting tube of the unit through a lateral path of extremely low flow resistance and this feature together with solids transfer conduit means at the lower ends of the contacting tubes and with the maintenance of a considerably lower particle concentration in the dispersed suspension in the up-flow tube, relative to the particle concentration in the moving bed or fluidized dense phase descending in the solids down-flow tube, permit the continuous cyclic flow of particulated material through each of the contacting and conversion zones in a manner which provides the advantages of the conventional continuous fluidized conversion operations and at the same time avoids significant drawbacks of the latter as hereinbefore referred to.

Reference to the accompanying drawing and the following description thereof will serve to more clearly point out the operation and advantages of the continuous cyclic solids flow of the present invention, and the simplified construction and arrangement of the unitary contacting apparatus.

Figure 1 of the drawing indicates diagrammatically one embodiment of the vertically disposed unit of the apparatus and means for effecting a fluidized conversion operation in accordance with the present invention.

Figure 2 of the drawing indicates diagrammatically a modified embodiment of the unit, with heating or cooling jacketing means in combination with the tubular reaction zones, and a separate stripping chamber at the lower end of the unit.

Figure 3 of the drawing is a sectional plan view indicating diagrammatically still another construction embodiment, which provides for elongated tubular reaction sections within a single jacketing chamber which in turn is suitable to accommodate a heat transfer medium.

Referring now to Figure 1 of the drawing, a conduit 1, having valve 2, provides a means for introducing a fluid reactant stream to the lower end of the vertically disposed tubular up-flow or reaction zone 3, wherein the charge stream contacts heated subdivided contact material being supplied by way of conduit 4 and control valve 5 from a confined tubular solids down-flow or regenerating zone 6. As noted hereinabove, the improved flow and apparatus arrangement of this invention may be utilized to advantage for many types of conversion operations, however, for description purposes the present embodiments will be referred to as a fluid catalytic cracking operation, wherein a hydrocarbon oil stream is undergoing catalyzed conversion in the presence of any one of the several types of suitable finely divided or powdered cracking catalysts known to those familiar with the art, such as silica-alumina, silica-magnesia, Super Filtrol, and the like. Thus, the commingled hydrocarbon and catalyst particles pass as an upwardly rising dispersed suspension through the tubular reaction zone 3 to an interior section 7 of a divided separating chamber 9.

The separating chamber 9 is partitioned with a suitable solid partitioning member 10, which extends from the upper end of the separator 9 to within a short distance of the bottom end thereof, forming the two adjacent sections 7 and 8. The cross-sectional free area of the opening between the partitioning member 10 and the bottom of the separator 9 is generally at least as large as, and preferably larger than, the cross-sectional free area of either of the zones 3 and 6. The partitioning member 10 may be provided on one or both sides with a layer of heat insulating material, or it may be constructed to confine a layer of heat insulating material, whenever it is desired to preclude heat transfer between the two dilute phase regions or vapor separating sections 7 and 8 of the separator. The enlarged cross-sectional area of the section 7 in the separating chamber 9 permits the entrained and fluidized catalyst particles to be carried upwardly and outwardly from the open end of the upper extremity of the reaction zone 3 and settle by gravitation into a relatively dense fluidized bed of particles maintained within the lower portion of the section 7 of separator 9, the upper extremity of that fluidized bed being indicated by the broken-line 11. A vaporous reaction product stream with small amounts of entrained particles passes through a suitable separator, such as the centrifugal type separator 12, permitting a cleaned product stream to pass by way of line 13 and valve 14 to appropriate fractionating and recovery apparatus which is not shown. Recovered catalyst particles are returned to the lower end of the separating zone 7 by way of a dip leg 15.

A suitable inert stripping and aerating medium, such as steam, is charged by way of line 16, valve 17, and distributing header 18 to the lower portion of the fluidized bed 11 in section 7, such that vaporous hydrocarbon products entrained with or occluded in catalyst particles may be substantially stripped therefrom prior to the passage of the particles into the adjoining section 8 of the separating chamber 9. A fluidized bed of catalyst particles, indicated by the broken line 19, is also maintained within this adjacent separating section 8, and from a point within this bed of particles a stream of catalyst is continuously withdrawn downwardly in a relatively compact moving or fluidized dense phase column of particles into the elongated tubular regenerating zone 6. The fluidized bed of particles 19 is aerated by a suitable inert gaseous stream, such as steam or flue gas, entering by way of line 20 and valve 21, and a distributing header 22. Fluidization of the bed of particles within each of the adjacent sections 7 and 8 is maintained, as indicated, with a higher level 11 within section 7 than within section 8, or alternatively, such that the density of the fluidized bed within section 7 is greater than that within section 8, to permit a continuous flow of particles from the one zone to the other as desired.

A stream of suitable regenerating fluid, which in the case of a catalytic cracking process is air or another gas containing free oxygen, is passed to the lower end of the tubular regenerating zone 6 by way of line 23 and control valve 24. The oxygen-containing stream passes upwardly at a relatively low linear velocity and countercurrently to the descending column of particles, preferably in a manner effecting fluidization as well as the simultaneous oxidation and removal of contaminating carbonaceous matter from the catalyst particles in the tubular zone 6. Resulting flue gases are ejected from the open upper end of the tubular zone 6 into the upper portion of separating section 8 of chamber 9. As described in connection with the separating section 7, the enlarged cross-sectional area of the section 8 permits a major portion of any entrained particles to descend by gravity into the fluidized bed 19; thus the flue gas stream with only a small portion of catalyst entrained therewith is passed through a separator 25 for discharge by way of line 26 and valve 27. Recovered catalyst particles are returned from the lower end of the separator 25 by way of a dip leg 28 and thus are maintained within the solids cycle.

Reactivated catalyst particles, with at least a major portion of their carbonaceous deposit removed therefrom by contact with the oxygen-containing regenerating stream, and in a heated state, by reason of the exothermic oxidation reaction, are continuously passed from the lower end of the tubular regenerating zone 6 by way of line 4 into the lower end of the tubular reaction zone 3, for commingling with the hydrocarbon reactant stream as described above. A suitable stripping medium may be introduced by way of line 29 and control valve 30 into transfer conduit 4 for effecting the stripping and removal of entrained gaseous products from the regeneration zone, the stripping medium and removed gaseous materials passing upwardly through the regenerating zone 6 together with the regenerating stream.

Inasmuch as the present improved flow and the simplified unitary apparatus of this invention provides for the use of an elongated tubular solids up-flow reaction zone 3, it is necessary to use relatively high gas or vapor velocities of the order hereinbefore indicated to effect the transporting and lifting of the contact material from the lower end of the reaction path to its upper extremity within the separating chamber 9. Therefore, the density of the dispersed suspension in the up-flow reaction path is usually lower than that maintained within the fluidized dense phase bed of conventional chamber types of reaction zones. If necessary a diluent or inert gaseous medium may be used in combination with a reactant stream to provide the desired ratios between the latter and the subdivided material, e. g. the desired catalyst to oil ratios in the operation here selected for illustration. Temperatures within the reaction zone 3 may be controlled as in the conventional units, by controlling the preheating, if any, of the reactant stream and the heat content of the catalyst particles passing from the regenerating zone 6 into the lower portion of the reaction zone 3.

In the regenerating zone 6, where the catalyst flows downwardly countercurrently to the reactivating stream, much lower gas velocities are used than in the zone 3 so that a flow reversal or a net upward flow of the catalyst particles through the zone 6 is precluded. Thus, the cross-sectional area of the regenerating zone, the quantity of the regenerating gas and its velocity must be balanced in a given unit to provide the desired downward movement of particles while at the same time providing for adequate oxidation and removal of the carbonaceous deposit on the contacted particles. An inert diluent gas stream may also be mixed with the regenerating gas stream to provide increased quantities of gaseous material, where such is desirable.

The upper extremity of each of the solids up-flow and down-flow tubes 3 and 6 generally is unrestricted and has a cross-sectional free area at least as large as the average cross-sectional free area of the entire path confined by the respective tube. Preferably also, each of these tubes has vertically coaxial end portions. Generally, the solids down-flow tube 6 has about the same volumetric capacity as the solids up-flow tube 3, and is of shorter length and larger diameter than the latter. For any given operation, however, the volumetric capacities of the tubes 3 and 6 are selected in relation to the particle concentrations to be maintained in these tubes in such manner that the desired solids residence time in each tube is assured. It is to be understood, therefore, that the volumetric capacity of the solids down-flow tube 6 may be smaller or larger than that of the solids up-flow tube 3, depending on the particular operation to be performed. When effecting a catalytic hydrocarbon oil cracking reaction with concurrent flow of the hydrocarbon reactant and catalyst in the up-flow tube 3, and catalyst regeneration during countercurrent contact of the catalyst and regenerating gas in the solids down-flow tube 6, that is a particularly advantageous operation, the latter tube is designed with such volumetric capacity that the catalyst particles can be afforded therein a substantially greater residence time than in the up-flow tube 3. Thus, in a typical mode of performing a gas oil cracking operation in accordance with the method and means of this invention, the catalyst residence time in the tubular regeneration zone 6 is from about 3 to about 9 times, and preferably about 5 or 6 times as large as the catalyst residence time in the tubular reaction zone 6.

Referring now to Figure 2 of the drawing, there is shown a modification of the compact unitary apparatus of Figure 1, with a tubular up-flow reactor 3' and a tubular solids down-flow reactor 6' connecting with and positioned below a separating chamber 9' in accordance with Figure 1 of the drawing. Each of the solids up-flow and down-flow tubes or contacting zones 3' and 6' is, however, provided with a jacket or elongated chamber 31 and 32, respectively, whereby fluid mediums may pass in heat exchange relationship with each of these tubular contacting zones. The jacket 31 connects with a flange 33, at the lower end of the up-flow tube 3', and with a flanged expansion joint 34 at the upper end of the unit so that differential expansion between the tube 3' and the tubular chamber 31 may be adequately accommodated. An inlet line 35 and valve 36 provide means for introducing a fluid medium into the annular shaped section between tube 3' and the jacket 31, while an outlet line 37 and valve 38 provide means for discharging the fluid heat exchange medium. Similarly, the jacket 32 connects with a flange 39 at the lower end of the solids down-flow tube 6' and an expansion joint 40 at the upper end of the unit whereby differential expansion may be accommodated, while an inlet line 41 and valve 42 provide means for introducing a heat exchange medium into the annular shaped jacketed section. An outlet line 43 and valve 44 provide means for discharging the fluid medium after passing in heat exchange relationship with the exterior of the tubular zone 6'.

This jacketing and heat exchange feature provides for individual temperature control for each of the two vertical reaction conduits by indirect heat exchange with a fluid transfer medium. For example, in the case of an endothermic reaction it may be desirable to pass a heating fluid in indirect heat exchange with reaction zone 3', while with an exothermic reaction, such as an oxidative regeneration of catalyst, it may be desirable to pass a cooling medium into jacket 32 for indirect heat exchange with the regeneration zone 6'. The fluid heating and cooling mediums may be different fluid mediums; for example, hot regenerating gas from separator section 8' may be employed as the fluid heating medium, and water or low temperature steam may be admitted to jacket 32 to pass as cooling medium in heat exchange with the tubular contacting zone 6' while the latter is used as exothermic reactor and high temperature or superheated steam is recovered from jacket 32. Alternatively, the heat transfer medium may be one fluid circulating serially through the two jackets, with or without intervening cooling or heating outside of both of the jackets; for example, the fluid medium being discharged from the cooling fluid outlet line 43 may be passed into the heating fluid inlet line 35 at the top of the reaction section 3'. Moreover, the apparatus described with reference to Figure 2 is particularly suited for the simultaneous performance of two exothermic reactions with independent temperature control by cooling of the tubular reaction zones 3' and 6'.

The embodiment of Figure 2, also indicates a separate stripping chamber 45 below the reaction section 3' and receiving reactivated catalyst or contact material from a transfer conduit 4'. Suitable stripping medium is introduced into the lower end of the stripper 45 by way of line 46 and valve 47, with a distributing header 48 arranged internally to uniformly distribute the medium upwardly through the descending particles. A suitable movable sleeve or valving arrangement 49 may be provided at the lower end of the reaction zone 3' and within the lower portion of stripping chamber 45, in order to aid in the control of the flow of reactivated catalyst particles into the lower end of the reaction zone 3'. It is to be understood, however, that in addition to, or instead of the valving arrangement 49, a control valve may be employed in line 4' corresponding to the valve 5 in line 4 of Figure 1.

As in the embodiment of Figure 1, the catalyst particles are taken into the lower end of the tubular reaction zone 3' of Figure 2 to become commingled with the fluid stream rising therethrough upon introduction by way of line 1' and valve 2'. The separation of the product stream from contacted catalyst particles within the separating chamber 9' is effected as described in connection with Figure 1 of the drawing, and similarly, the particles are transferred from one section of the chamber laterally along the lower portion of the separating chamber to the adjacent separating section for subsequent withdrawal downwardly through the tubular regeneration zone 6'.

Referring now to Figure 3 of the drawing, there is shown diagrammatically in a sectional plan view, a method for circulating a transfer medium around both vertical particle contacting tubes, such as a reaction conduit 50 and a regeneration conduit 51. As in the embodiments described with reference to Figures 1 and 2, the continuous contacting operation is carried out in the manner where a fluid reactant stream entering through line 52 and valve 53 commingles with catalyst particles and the mixture passes upwardly as a dispersed suspension through the vertical reaction conduit 50. The particles commingling with the reactant stream pass by conduit means not shown from the lower end of the vertical tubular regeneration zone 51, the particles being passed downwardly through this regeneration zone countercurrently to a reactivating fluid stream entering the lower end of the conduit 51 by way of line 54 and valve 55.

A single jacket or container 56 encompasses both the reaction and regeneration tubes 50 and 51 so that a single fluid heat exchange medium is in contact with the exterior of each tube and thus aids in controlling the temperatures within each of the tubular zones 50 and 51 and the transferring of heat from one zone to the other. It is not intended to limit the heat transfer medium to any one particular type of material, for example in high temperature conversion operations, such as those performed at temperatures of the order of 900°–2000° F., it may be desirable to use a molten metal or molten salt mixture, while in conversion operations at more moderate temperatures, water or oil or the like may be used for this purpose. The heat transfer medium may be introduced at the outset of an operation or continuously by way of an inlet line at the top of the chamber, not shown, and withdrawn upon completion of an operation or continuously during the performance thereof from a lower outlet line 58 having valve 59; alternatively, the lower line 58 may be utilized as the inlet line and an upper line as an outlet line.

It may also be desirable to utilize a bank of tubes 57, having an upper header and a lower header, the latter connecting with a line 60 and valve 61 such that a separate fluid may be passed into or out of the tube bank for additional heat control purposes. It may be found desirable to either add heat to, or abstract heat from, the heat transfer medium contained within the chamber 56, or alternatively, it may be desirable to have a screening bank of tubes positioned longitudinally between the contacting conduits 50 and 51 for substantially the entire length within the jacketing chamber 56. The latter arrangement is of particular advantage for the simultaneous performance of two exothermic reactions at substantially equal temperatures in the tubular up-flow and solids down-flow paths with dissipation of the excess heat by the generation of steam in the tube bank 57.

It may thus be seen that the elongated tubular particle contacting zones have a distinct advantage over the large diameter chambers employed for effecting fluidized contacting in large diameter dense phase fluidized beds, in that they may be closely spaced and may be more readily brought into heat exchange relation, such for example as illustrated by the embodiments of Figure 2 and Figure 3. Also, as hereinbefore mentioned, a considerable economy is attained in the construction and erection of a tubular type of unit as compared to the cost of the more conventional large diameter chambers and their supporting structures. The present invention also provides a distinct advantage in the use of the single separating chamber having the means to separately discharge resulting product streams while accommodating the subdivided solid particles in fluidized beds communicating with each other so that lateral flow of particulated solid from one bed to another is maintained to in turn effect a continuous flow of solid particles through a cyclic path which presents a minimum of flow resistance and permits an unusually smooth and steady solids circulation. The single separating chamber of the present system performs simultaneously the three functions of fluid products recovery, solids particle stripping, and solids particle transfer from the discharge end of the one contacting zone to the inlet end of the other, and thereby not only permits a substantially reduced requirement of apparatus elements and supporting structures, relative to the chamber type contacting systems heretofore employed in industrial practice but also assures an appreciable economy in operating and maintenance costs because of the elimination of numerous apparatus parts of the conventional systems constituting a source of substantial heat losses or requiring extensive insulation to prevent such losses.

The apparatus of the invention may be supplemented by suitable solids supply and withdrawal conduits to permit intermittent or continuous introduction of fresh particulated solid material and withdrawal of contacted or treated solid particles. For example, a solids supply conduit may be connected with the feed line 1 or 1', respectively, and a withdrawal conduit for removal of a controlled portion of the solid particles during the operation of the unit may be connected in the case of Figure 1 to line 4 between the valve 5 therein and the point of connection of line 29 thereto, or in the case of Figure 2, to the bottom of the stripper 45.

Moreover, without departing from the invention, the present apparatus may be modified by providing a plurality of vertical up-flow contacting tubes having substantially identical dimensions and being closely spaced in a bank of tubes, and a corresponding plurality of vertical solids down-flow tubes, also having substantially identical dimensions and being closely spaced in a separate bank parallel to the bank of up-flow tubes. In such modification the upper extremities of all tubes terminate in a single separating chamber analogous to that herein before described with the up-flow tubes terminating on one side of the depending partition in the separating chamber, and the solids down-flow tubes terminating on the other side of that partition, and the lower extremities of each pair of opposite up-flow and solids down-flow tubes are connected by a conduit corresponding to the conduit 4 of Figure 1 or, alternatively, the lower extremities of the solids down-flow tubes may be individually connected to a single stripper enveloping the lower extremities of the up-flow tubes in a manner analogous to that described with reference to Figure 2.

In the operations herein contemplated the appropriate particle concentrations are readily maintained in the dispersed suspension in the up-flow tube, the fluidized bed or beds in the separating chamber, and the descending column in the solids down-flow tube when utilizing solid particles of between about 0.01 and 1 mm. average diameter, and within this range the best average size for most purposes is from 45 to 200 microns.

While the invention has been described above primarily with reference to the catalytic cracking of hydrocarbon oils it is similarly applicable to the catalytic dehydrogenation of hydrocarbons into derivatives having an unchanged number of carbon atoms per molecule and a lower hydrogen content and to the improvement of the motor fuel characteristics or aromaticity of gasolines and naphtha fractions by catalytic reforming or hydroforming, the conversion being effected in each of these operations preferably in the tubular up-flow reaction path with catalyst regeneration by oxidizing gases in the tubular solids down-flow reaction path. In an analogous manner, normally gaseous hydrocarbons may be thermally converted into a gaseous product having a high content of free hydrogen or highly unsaturated hydrocarbons at temperatures generally in excess of 1800° F. in contact with particles of a refractory inert solid material of high heat conductivity in the up-flow reaction path, the reaction heat requirements being imparted to the particulated solid in the solids down-flow path by combustion of carbonaceous deposits on the particles and, if required, of additional fuel introduced from an extraneous source into the solids down-flow path.

The process and apparatus of the invention may be applied moreover to the partial oxidation of hydrocarbons in the vapor phase with the aid of particles of a solid contact material which acts as heat transfer-agent and at the same time may catalyze or otherwise foster the controlled oxidation of the hydrocarbon reactant in the presence of oxygen supplied from an extraneous source or donated in the reaction zone by the solid contact material. Thus, methane may be converted in the tubular up-flow reaction zone at a temperature of 900–1200° F. to formaldehyde in contact with a reducible metal oxide of the type of cupric oxide which during the conversion undergoes reduction by donating oxygen for the controlled oxidation of the hydrocarbon reactant and is subsequently reoxidized in the tubular solids down-flow zone at a moderately higher temperature than that maintained in the up-flow reaction zone. In another application of this invention to the selective oxidation of vaporizable organic materials, aromatic hydrocarbons such as naphthalene or orthoxylene may be converted to phthalic anhydride and maleic anhydride with the aid of an oxidizing gas and a suitable oxidation catalyst such as vanadium oxide at temperatures of from 900° to 1100° F. and approximately atmospheric or moderate superatmospheric pressure and contact times of 0.25–0.8 second with control of the reaction temperature by a molten salt bath surrounding the reaction zone and the solids down-flow path, while the catalyst is regenerated in the latter by contact with a mixture of air and recirculated cooled regeneration gas.

Although the invention has been described above largely with reference to the performance of two reactions in such manner that an oxidizing reaction involving combustion of carbonaceous material occurs in the tubular solids down-flow path simultaneously with conversion of a hydrocarbon reactant in the tubular up-flow reaction path it is to be understood that the invention is applicable also to operations wherein controlled oxidation of a fluid reactant or combustion of carbonaceous material does not take place in either of the tubular reaction paths or substantially only in the tubular up-flow path, and further to operations wherein neither of the fluid reactants supplied to the tubular up-flow path and the solids down-flow path, respectively, is a hydrocarbon.

In one specific and highly advantageous mode of applying the invention, for example, unsaturated aldehydes and ketones containing an olefinic linkage between two carbon atoms of aliphatic character, one of which is directly linked to an aldehyde or ketone group may be produced from olefins having at least three carbon atoms per molecule, more particularly from the aliphatic monoolefins of from 3 to 6 carbon atoms per molecule and the cycloolefins of from 5 to 7 carbon atoms per molecule, by reacting the olefinic reactant in the vapor phase with controlled amounts of added oxygen in the presence of an active cuprous oxide catalyst suspended in the reactant mixture and added steam in the tubular up-flow reaction path at a temperature of from about 350 to about 800° F., stripping the catalyst particles in the fluidized dense phase with steam in the first separator section to substantially remove adsorbed or entrained hydrocarbonaceous material therefrom, further stripping the catalyst particles in the fluidized dense phase in the second separator section with a mixture of air and flue gas or steam such that the fresh stripping medium contains free oxygen in an amount not exceeding about 5 percent by volume of the stripping medium, countercurrently contacting the catalyst particles in a downwardly moving compact column thereof in the tubular solids down-flow path with a mixture of steam and hydrogen or another reducing gas mixture of controlled free hydrogen content, such that the free hydrogen in the gas mixture is substantially consumed by reduction of the catalyst to cuprous oxide within the solids down-flow path, passing the thus reactivated cuprous oxide catalyst particles to the inlet of the tubular up-flow reaction path, and maintaining the catalyst reducing temperature substantially equal to the olefin oxidizing temperature and dissipating the excess heat liberated by the reactions by providing for indirect heat exchange between a fluid cooling medium and both of the tubular reaction paths, preferably by means of the heat exchange arrangement described with reference to Figure 3 so as to produce steam at the temperature desired for its use in the operation by utilization of the excess reaction heat with the aid of the bank of tubes 57. This mode of operation permits to secure high yields of vinyl-type carbonyl compounds, such as acrolein from propylene, methyl vinyl ketone from butene-1 or butene-2 or a mixture thereof, methylisopropenyl ketone from 2-methyl-butene-2, and cyclopentenone-2 from cyclopentene.

In another specific mode of applying the invention a vaporous olefin such as a butene and a halogen such as chlorine are passed upwardly in the solids down-flow path through a descending column of substantially inert solid refractory particles at a rate to maintain this column in fluidized state and at a higher solids concentration than the fluidized bed in the separator sections, the proportions of olefin and halogen in the feed mixture are maintained to yield an addition product, and the reaction temperature is controlled to substantially suppress substitution reactions in the solids down-flow reaction path by commingling the solid particles upon their discharge from the descending column with cool air, passing the mixture as a dispersed suspension through the tubular up-flow path, and returning the cooled particles through the fluidized dense phase in the separator to the top of the descending column in the solids down-flow path at a rate adequate to absorb the excess exothermic heat of reaction, the fluidizing being effected in the first separator section with a portion of the gas withdrawn from the upper portion of the first separator section while the fluidized bed is maintained in the second separator section by means of an inert gas or normally gaseous paraffin.

The following example will serve to illustrate an application of the invention to the conversion of reactants other than hydrocarbons. Cyclohexanol and hydrogen in practically equimolecular proportions are passed at a temperature of about 750° F. upwardly through a descending particle column of a catalyst comprising about 5 percent by weight of platinum supported on an inert siliceous support or active carbon in the solids down-flow path at an hourly weight space velocity of about 8 or 9, whereby the cyclohexanol is selectively dehydrogenated into phenol, the used catalyst particles are commingled with a reducing gas rich in free hydrogen and are passed in dispersed suspension therein upwardly through the tubular up-flow path wherein they are reactivated by the action of the reducing gas at a temperature of about 750–765° F., and the reactivated catalyst particles are returned through the fluidized dense phase bed in the separator substantially without cooling to the inlet end of the solids down-flow reaction path, while the fluidizing is effected for the bed in the first separator section with hot gas withdrawn from the upper portion of this section, and for the bed in the second section with heated inert or hydrogen gas; both the tubular up-flow and solids down-flow reaction paths preferably are maintained largely immersed in a molten salt bath, to which sufficient heat is supplied by suitable heating elements to maintain substantially uniform and constant reaction and reactivation temperatures.

In all of the operations in accordance with the invention as described above the fluid products discharged from the tubular up-flow path into the first separator section and the fluid products discharged from the tubular solids down-flow path into the second separator section are invariably maintained separated from each other with the aid of the partition extending from the top of the separator downwardly into the fluidized dense phase bed in the lower portion thereof and are removed from the separator sections as separate streams to be thereafter directed to suitable product recovery systems or places of utilization or disposal. While the solids cycle comprising the tubular up-flow path, the separating zone, and the tubular solids down-flow path during its operation is maintained at any desired subatmospheric, atmospheric or superatmospheric pressure level, the pressures in the first and second separating sections are preferably balanced or equalized by manual or automatic regulation of flow control devices in the fluid outlets from the separating sections, such as by the valves 14 and 27 in the lines 13 and 26, respectively, of the apparatus illustrated in Figure 1.

I claim as my invention:

1. A contacting process which comprises maintaining a fluidized body of solid particles in the lower portion of a confined chamber having partitioning means dividing the chamber into separate vapor zones and said body of particles into communicating first and second fluidized beds, transferring particles laterally from the lower portion of said first bed to the lower portion of said second bed, withdrawing particles from said second bed and passing the same downwardly in a column of smaller cross-sectional area than the second bed, passing a fluid reactant upwardly through said column and into the vapor zone above said second bed, commingling solid particles from the lower portion of said column with a second fluid reactant and passing the resultant mixture upwardly through a confined elongated reaction path of smaller cross-sectional area than and extending through said first bed, discharging the mixture from said confined path into the vapor zone above said first bed and there separating the mixture into fluid products and solid particles, gravitating the latter to said first fluidized bed, and removing reacted fluid from each of said vapor zones.

2. The process of claim 1 further characterized in that the first-mentioned fluid reactant is an oxygen-containing gas and said second fluid reactant is a hydrocarbon material.

3. The process of claim 1 further characterized in that said solid particles comprise cracking catalyst, said second fluid reactant is a hydrocarbon cracking stock which is cracked in said confined path, and the first-mentioned reactant is an oxygen-containing gas for regenerating the catalyst particles in said descending column.

4. The method of claim 3 further characterized in that an inert stripping medium is introduced into the lower portion of each of the fluidized beds maintained within said chamber whereby to effect both the stripping of separated catalyst particles and the control of particle density in each of said fluidized beds.

5. A contacting apparatus comprising an enlarged chamber, a vertical partition depending from the top and terminating a short distance above the bottom of the chamber, an elongated vertical up-flow tube extending a substantial distance below the chamber from a point within the chamber on one side and above the lower end of said partition, an elongated vertical down-flow tube extending a substantial distance below the chamber from a point within the chamber on the other side of said partition and terminating at an elevation at least as high as the lower end of said partition, said tubes being open at their upper ends and the up-flow tube extending to a higher elevation in the chamber than the down-flow tube, means for passing a fluid and solid particles upwardly through said up-flow tube into the chamber, means for transferring solid particles from the the lower portion of the down-flow tube to the lower portion of the up-flow tube, means for introducing fluid to the lower portion of the down-flow tube, and fluid outlets connected to the chamber on opposite sides of said partition.

6. The apparatus of claim 5 further characterized in the provision of gas inlet and distributing means in the lower portion of the chamber on each side of said partition below the upper end of the tube therein.

7. The apparatus of claim 5 further characterized in that an enlarged cross-sectional area stripping chamber is positioned at the lower portion of said up-flow tube with conduit means connecting the lower end of said down-flow tube with the upper portion of said stripping chamber, and the lower portion of said stripping chamber encompassing and communicating directly with the lower end of said up-flow tube, and a stripping fluid inlet connecting with fluid distributing means in the lower portion of said stripping chamber.

8. The apparatus of claim 5 further characterized in that a closed elongated jacket is spaced away from and encompasses said up-flow tube along at least a predominating portion of its length, another closed jacket is spaced away from and encompasses said down-flow tube along at least a predominating portion of its length, and each of said jackets has fluid inlet and outlet means so as to provide for an indirect heat exchange fluid flow throughout the length of each of said jackets.

References Cited in the file of this patent

UNITED STATES PATENTS

| Number | Name | Date |
|---|---|---|
| 2,396,109 | Martin | Mar. 5, 1946 |
| 2,416,729 | Arveson | Mar. 4, 1947 |
| 2,427,341 | Alther | Sept. 16, 1947 |
| 2,463,623 | Huff | Mar. 8, 1948 |
| 2,464,812 | Johnson | Mar. 23, 1949 |
| 2,468,508 | Munday | Apr. 26, 1949 |
| 2,514,288 | Nicholson | July 4, 1950 |
| 2,556,114 | Smith | June 5, 1951 |
| 2,561,409 | Ardern | July 24, 1951 |